(12) United States Patent
Tamayo et al.

(10) Patent No.: US 10,880,518 B1
(45) Date of Patent: *Dec. 29, 2020

(54) SYSTEMS AND METHODS FOR INTEGRATING AND CONDUCTING VIDEO SESSIONS

(71) Applicant: UNITED SERVICES AUTOMOBILE ASSOCIATION (USAA), San Antonio, TX (US)

(72) Inventors: Enrique A. Tamayo, San Antonio, TX (US); Nicole Calderon, San Antonio, TX (US); Wesley Purcell, Boerne, TX (US); Luis Mireles, Fair Oaks Ranch, TX (US); Felisa Flores, San Antonio, TX (US); Vijay Jayapalan, San Antonio, TX (US); Jeffrey William Gallagher, San Antonio, TX (US); Minya Liang, Redmond, WA (US); Nathan J. Rowe, San Antonio, TX (US); David W. Gaither, San Antonio, TX (US); Elizabeth Guerrero, San Antonio, TX (US)

(73) Assignee: UNITED SERVICES AUTOMOBILE ASSOCIATION (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/547,147

(22) Filed: Aug. 21, 2019

Related U.S. Application Data

(63) Continuation of application No. 15/415,342, filed on Jan. 25, 2017, now Pat. No. 10,432,892.

(Continued)

(51) Int. Cl.
*H04N 7/14* (2006.01)
*H04M 3/51* (2006.01)
(Continued)

(52) U.S. Cl.
CPC ......... *H04N 7/147* (2013.01); *G06K 9/00892* (2013.01); *G06Q 40/08* (2013.01); *H04M 3/5133* (2013.01); *H04N 7/15* (2013.01)

(58) Field of Classification Search
CPC . G06K 9/00892; G06Q 40/08; H04M 3/5133; H04N 7/147; H04N 7/15
(Continued)

(56) References Cited

U.S. PATENT DOCUMENTS 8,830,291 B2     9/2014   Kay
10,432,892 B1 *   10/2019   Tamayo ................. G06Q 40/08
(Continued)

OTHER PUBLICATIONS

U.S. Appl. No. 62/287,572, filed Jan. 27, 2016, Systems and Methods for Integrating and Conducting Video Sessions.
(Continued)

*Primary Examiner* — Hemant S Patel
(74) *Attorney, Agent, or Firm* — Perkins Coie LLP

(57) ABSTRACT

Methods and systems described in this disclosure describe an integration of video sessions across platforms, transforming the user experience. In some embodiments, a user can participate in an interaction via a channel. Next, the system can determine whether the interaction is eligible for a video session with a representative. When the interaction is eligible for the video session, an option for the video session can be displayed on a user interface of the device. After receiving a request for the video session, the video session can be routed to a uniquely skilled representative, where the uniquely skilled representative is determined based, at least in part, on the interaction.

20 Claims, 8 Drawing Sheets

Related U.S. Application Data

(60) Provisional application No. 62/287,572, filed on Jan. 27, 2016.

(51) Int. Cl.
    *H04N 7/15*     (2006.01)
    *G06K 9/00*     (2006.01)
    *G06Q 40/08*     (2012.01)

(58) Field of Classification Search
    USPC .................. 348/14.1–14.16, 14.01–14.16;
                    379/201.01, 202.01–207.01,
            379/265.01–266.1; 709/201–207,
                                709/217–248
    See application file for complete search history.

(56) References Cited

U.S. PATENT DOCUMENTS

| | | |
|---|---|---|
| 2005/0163302 A1 | 7/2005 | Mock |
| 2007/0294354 A1 | 12/2007 | Sylvain |
| 2009/0012373 A1 | 1/2009 | Raij |
| 2009/0187455 A1 | 7/2009 | Fernandes |
| 2012/0278176 A1 | 11/2012 | Naor |
| 2013/0039483 A1 | 2/2013 | Wolfeld |
| 2016/0037126 A1 | 2/2016 | Polyakov |
| 2016/0132847 A1 | 5/2016 | Sarris |

OTHER PUBLICATIONS

U.S. Appl. No. 15/415,342, filed Jan. 25, 2017, Systems and Methods for Integrating and Conducting Video Sessions.

\* cited by examiner

SYSTEMS AND METHODS FOR INTEGRATING AND CONDUCTING VIDEO SESSIONS

CROSS-REFERENCE TO RELATED APPLICATIONS

The present application is a continuation of U.S. application Ser. No. 15/415,342, filed Jan. 25, 2017, entitled "SYSTEMS AND METHODS FOR INTEGRATING AND CONDUCTING VIDEO SESSIONS", now allowed; which is non-provisional of and claims priority to U.S. Provisional Application No. 62/287,572, filed on Jan. 27, 2016, entitled "SYSTEMS AND METHODS FOR INTEGRATING AND CONDUCTING VIDEO SESSIONS," each of which are hereby incorporated by reference in their entireties for all purposes.

TECHNICAL FIELD

Various embodiments of the present disclosure generally relate to video sessions. More specifically, various embodiments of the present disclosure relate to methods and systems for integrating video sessions.

BACKGROUND

Although call centers have become standard for many companies, customers often prefer to conduct business in a face-to-face environment. In some cases, representatives have been replaced or supplemented by Interactive Voice Response (IVR) systems, completely eliminating human contact.

BRIEF DESCRIPTION OF THE DRAWINGS

Embodiments of the present disclosure will be described and explained through the use of the accompanying drawings, in which.

DETAILED DESCRIPTION

Figure 1:
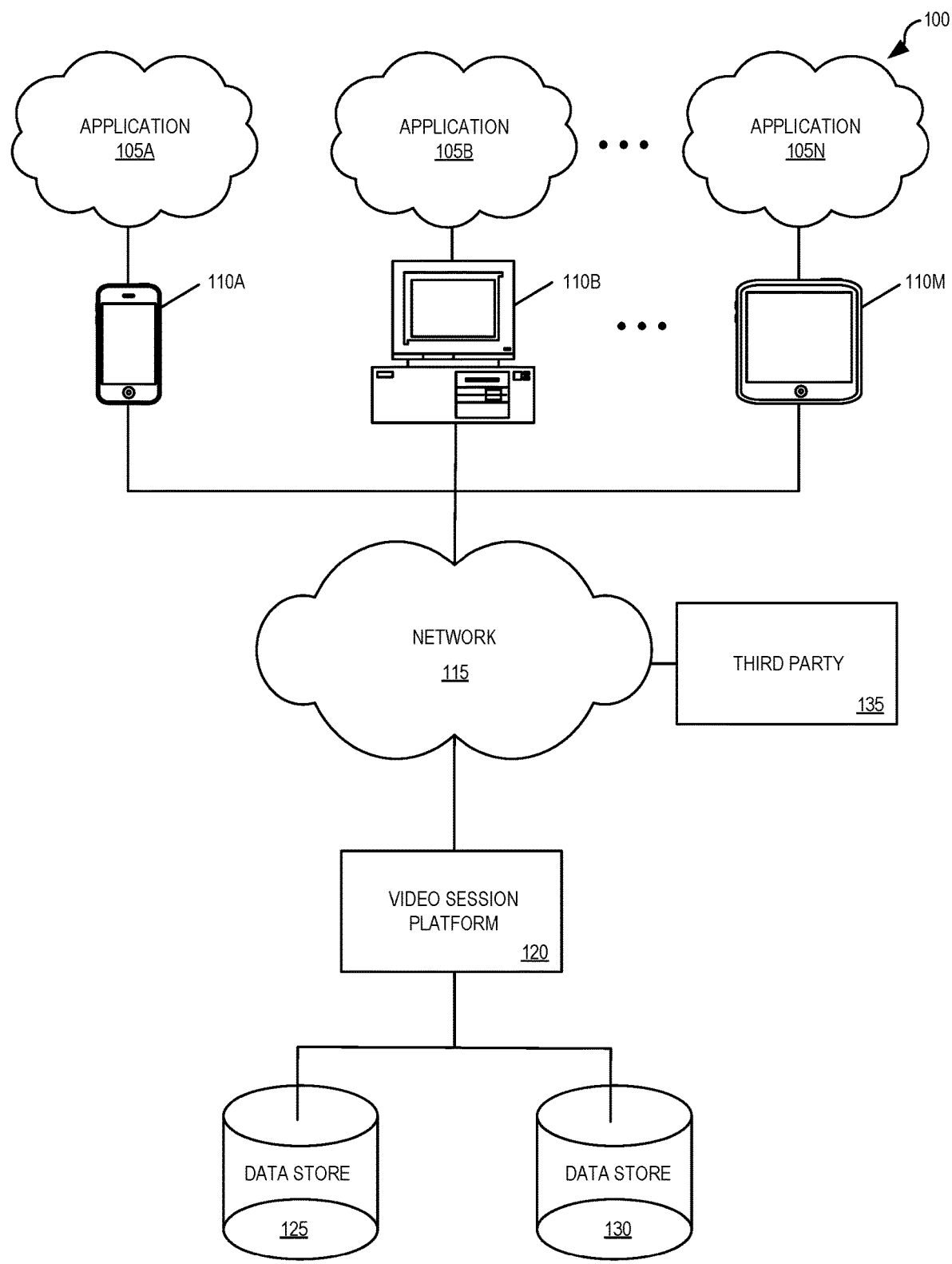
FIG. 1 illustrates an example of a network-based operating environment in accordance with various embodiments of the disclosure.

Various embodiments of the present disclosure generally relate to video sessions. More specifically, various embodiments of the present disclosure relate to methods and systems for integrating video sessions.

Organizations often provide call centers where customers can work with a representative over the phone to discuss products, to resolve issues, and to answer questions. Despite the prolific nature of such call centers, many people would prefer to conduct business in a face-to-face setting. Methods and systems disclosed herein allow users to have a face-to-face experience over a video session with a representative.

Regardless of the platform used to initiate or participate in a voice session, users can have a similar experience. This is accomplished by a unification of architecture, such that a singular platform manages access to the organization without regard to the device or application being used (i.e., the same queuing and routing delivery/endpoint strategy can be used for all parts of the organization). Different access points can use a centralized codec and a centralized delivery architecture. Thus, regardless of whether the user is logged into an account via a website portal on a desktop or logged into a mobile application on a smartphone, tablet, or other wearable device, the user has the same video session experience.

A user may be logged onto a website portal, a mobile application, or in a face-to-face meeting at a financial center interacting with an organization for various purposes, such as to check a balance, to apply for a loan, to pay a bill, or to check an insurance claim. Various factors may determine whether the caller is eligible to participate in a video session with a representative. For example, the user must be interacting within the hours of operation for a video session and the device may have to be connected to the internet, sometimes with certain speed or bandwidth availability. The user may be limited to a one-way video session, depending on available resources and capabilities of the user's device and network. In some embodiments, a virtual assistant and/or virtual chat can be used, or may be required to be used, before the user is eligible for the video session.

When the interaction is eligible for a video session, an option to initiate the video session may be displayed within the application or otherwise on the device. The video session may be routed to a uniquely skilled representative. The uniquely skilled representative may be determined based on various factors, such as the interaction (e.g., context of interaction on website portal or mobile application, time of day, searches done within a predetermined past period of time on the device or other devices, questions the user previously asked, recent event such as the purchase of a vehicle or a home) and the location of the device.

The video session can be a one-way video session such that only the representative is transmitting video or a two-way video session such that both the user and the representative are transmitting video feed. In some embodiments, when the session is a two-way video session, the user can show objects to the representative during the video session through the video feed, such as a car at an accident scene, and the representative and/or system can estimate a cost of the damage to the car. The system or representative may further determine insurance coverage and expected out of pocket payments during the video session or by using the information from the video session.

In some embodiments, the two-way video may allow for analysis of the user's biometrics (e.g., facial expressions, skin tone, eye movement, breathing pattern), providing the representative with additional information about the user, such as the user's mood or state of mind. For example, if an analysis of the user's biometrics detects a change in the user's skin tone or blinking pattern, the representative may be informed that the user is becoming impatient. In some embodiments, the biometric samples being received by the video feed can be analyzed and compared to previous biometric samples of the user to provide a better understanding of the user's typical state. The biometric samples may be constantly monitored and the representative may be notified in real-time of any changes. In some embodiments, external sensors attached to the user or coupled to the user's device may be used to provide further information to the representative (e.g., heart rate monitor).

Documents, such as a contract for insurance or a signed check, can be shown by the user during the video session and processed, such that the representative receives the document shortly after the user provides a video (i.e., image) of each page.

The video of the representative may appear as a thumbnail video on the user's screen such that the user can access mobile applications and websites during the video session. The user can pinch and zoom the video of the representative. In some embodiments, the representative can co-browse on the device during the video session and can annotate the user's screen during the session. In some embodiments, the representative can control the device, such as turning on a flashlight to better see during a virtual inspection of a building during a video session.

In some embodiments, a wait time for the video session can be estimated and provided to the user. The wait time may displayed in the mobile application in close proximity to the option to initiate the video session.

The user can access the video session option and engage in various activities through various channels. Examples of channels include modes of communication (e.g., a communications network) for exchanging data between devices. Devices may include, but are not limited to, computing devices, such as tablets, personal computers, and smartphones; point of sale devices; ATMs; connected smart devices, such as refrigerators, watches, and laptops; telephones, such as landline telephones or mobile phones; and face-to-face contact, such as interaction between a user and an employee of the organization. Channels may also include software and firmware associated with the devices and communications devices, such as web portals, applications (e.g., mobile applications), networks, and instant messaging systems. Channels may also include hardware associated with the computing devices and telephones, such as the network hardware, credit card scanners, and retinal scanners.

Channels allow the user to engage in activities with an organization during a session. For example, a user may use a web portal or mobile application (i.e., a channel) to engage in activities, such as viewing an account, trading funds, purchasing insurance, or submitting or processing a negotiable instrument. Each channel may accept unique verifying information, and the verifying information may change depending upon the caller and/or the activity requested. In some embodiments, the video session can be transferred from one channel or device to another channel or device. For example, the video session may be transferred from a mobile device to a desktop if the user is running low on battery in the mobile device.

This disclosure describes video session systems and methods designed to increase the service and the reliability of video sessions provided by an organization. Various embodiments may provide one or more of the following technological improvements: 1) an improved accuracy in identifying and determining uniquely skilled representatives using, for example, the user's location; 2) an increased efficiency in determining a state of a user, including real-time or near real-time notification of the user's biometric information; 3) real-time or near real-time translation or processing of documents; and 4) a video session system that is adaptable to multiple channels, including mobile applications, websites, and SMS messages.

In the following description, numerous specific details are set forth to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to third party 135, video session platform 120, and data stores 125 and 130.

Computing devices 110A-110M may be configured to communicate via the network 115 with video session platform 120. In some embodiments, computing devices 110A-110M can retrieve or submit information to video session platform 120 and run one or more applications with customized content retrieved by video session platform 120 and data stores 125 and 130. For example, computing devices 110A-110M can execute a browser application or a customized client to enable interaction between the computing devices 110A-110M, video session platform 120, and data stores 125 and 130.

Network 115 can be any combination of local area and/or wide area networks using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP) and file transfer protocol (FTP).

Data exchanged over network 115 may be represented using technologies, languages, and/or formats including hypertext markup language (HTML) or extensible markup language (XML). In addition, all or some links can be encrypted using conventional encryption technologies, such as secure sockets layer (SSL), transport layer security (TLS), and Internet Protocol Security (IPsec).

Video session platform 120 can run on one or more servers and can be used to initiate or receive video sessions, determine an identity of the caller, determine locations, activities and interactions of the user, determine whether the caller is eligible for a video session, route the video session to a specific representative or type of representative, provide co-browsing, accessing, and translation features during the video session, recognize objects and determine insurance quotes and claim estimates, analyze biometric information to authenticate the user and/or determine a status of the user, store profiles and/or policies in data stores 125 and 130, and/or perform other activities. In some embodiments, video session platform 120 includes various data processing and analytic tools that allow for video session eligibility determinations, insurance claims, and insurance estimates. In some embodiments, video session platform 120 is a server.

Video session platform 120 may be communicably coupled with third party 135, data stores 125 and 130 and computing devices 110A-110M and may communicate, access, or receive data (e.g., device information, authentication information, network information, application information) from third party 135, computing devices 110A-110M and data stores 125 and 130. Video session platform 120 may be associated with a membership organization (e.g., a financial institution or an insurance company), and the callers may be members of the membership organization.

Video session platform 120 may be customized or calibrated by individual companies or service providers based on user needs and/or business objectives. For example, companies may have different business rules and/or different criteria for determining whether a call is eligible for a video session, estimating wait times, accessing documents, and processing documents and other data.

Data stores 125 and 130 can be used to manage storage and access to user data, such as authentication history, registered devices, information relating to the registered devices (e.g., when the device was registered, whether the mobile application is downloaded on the device, networks the device connects to), user preferences, location information, security questions and answers, biometric information, search history, and other information. Data stores 125 and 130 may be data repositories of a set of integrated objects that are modeled using classes defined in database schemas. Data stores 125 and 130 may further include flat files that can store data. Video session platform 120 and/or other servers may collect and/or access data from data stores 125 and 130.

Third party 135 may be any type of service to provide translation services, route a call, identify devices and networks, perform biometric identification or verification services, send push notifications or text messages, and/or provide other functions related to video session solutions. In some embodiments, third party 135 can collect data and provide the data to video session platform 120.

Figure 2:
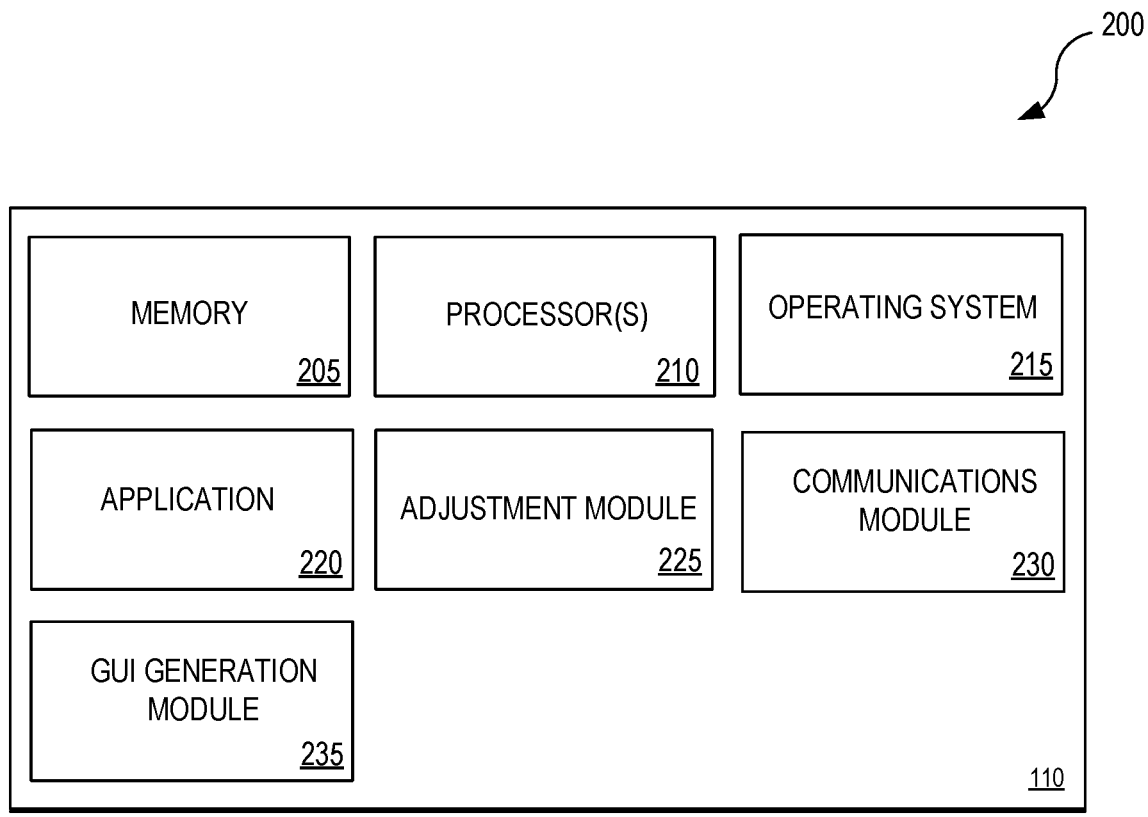
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, adjustment module 225, communications module 230, and graphical user interface (GUI) generation module 235. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module. For example, in one embodiment, application 220 and communications module 230 can be combined into a single component. In some embodiments, functionality associated with device 110 can be performed by video session platform 120 and vice versa.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory, memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), DDR RAM, small outline dual inline memory modules (SODIMMs), EPROM, EEPROM, compact discs, DVDs, and/or the like. In accordance with some embodiments, memory 205 may include one or more disk drives, flash drives, databases, tables, files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, adjustment module 225, communications module 230, and GUI generation module 235.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with video session platform 120. For example, application 220 can include an application for financial services, a money transfer application, a social networking application, and a gaming application.

Application 220 can access a server and/or a platform associated with an organization (e.g., video session platform 120) to accommodate a video session. Application 220 can also display account data (e.g., banking, insurance), options to call a representative on a video session and an associated wait time, and video feed of a representative. The video of a representative may be a smaller than the full size of the user's screen and may be overlaid on a tab of application 220. In some embodiments, application 220 can capture (e.g., using a video function on a device) a video feed of a user or objects (e.g., documents, damaged home, new home) for various purposes, such as transmitting documents without having to scan the documents into the device, determining insurance claims or estimates, and inspecting or appraising a new home.

In some embodiments, the user can multi-task while during the video session. For example, the user may be using the application (e.g., reviewing an account) while maintaining video contact with the representative. This capability may be especially useful when the user is requesting help from the representative with a task, such as filling out a form or deciphering account information. In some embodiments, the user may need to provide assurances or an acknowledgement of a policy or document. During the video session, the user can annotate a signature or provide other evidence via the device (e.g., a fingerprint).

In some embodiments, the video session can be voice activated (e.g., user opens a mobile application and states: "I want to speak with Jamie," then a video session is initiated). In some embodiments, the application interprets sign language or custom gestures received by the device. The application can interpret the sign language or custom gestures to initiate the video session on the user's behalf.

In some embodiments, the video session can be transferred between devices. For example, the device may be touched with a second device to have the video appear on the second device. This may be helpful if the first device is low on battery or is losing services, or if a different type of device is needed (e.g., transferring a video session from a mobile device to an ATM or vice versa).

Adjustment module 225 can adjust the size and/or the placement of the video within the application. The video may be displayed in a window overlaid on a page or a tab of the application (e.g., a thumbnail video) and may be smaller in size than the screen such that the user can view the page or tab of the application (and access functions in the application) and can move the video window around the screen. The user can use pinch and zoom functions to make the video window smaller or larger. In some embodiments, the video window can be hidden.

Communications module 230 can communicate with a third party (e.g., third party 135) and/or a server (e.g., video session platform 120). For example, communications module 230 may receive a prompt to provide biometric information via application 220 from video session platform 120 or third party 135. Communications may be exchanged via a call (e.g., a video session), text message, push notification, or other type of messaging. Communication module 230 can send data, such as a video of a document; a video of the user for biometric and other information; and/or a video of objects, such as insurance items for analysis.

GUI generation module 235 can generate one or more GUI screens that allow for interaction with a user. In at least one embodiment, GUI generation module 235 generates a graphical user interface receiving and/or conveying information to the user. For example, the GUI generation module 235 may display video during the session, push notifications, text messages, or other messages or information for the user.

Figure 3:
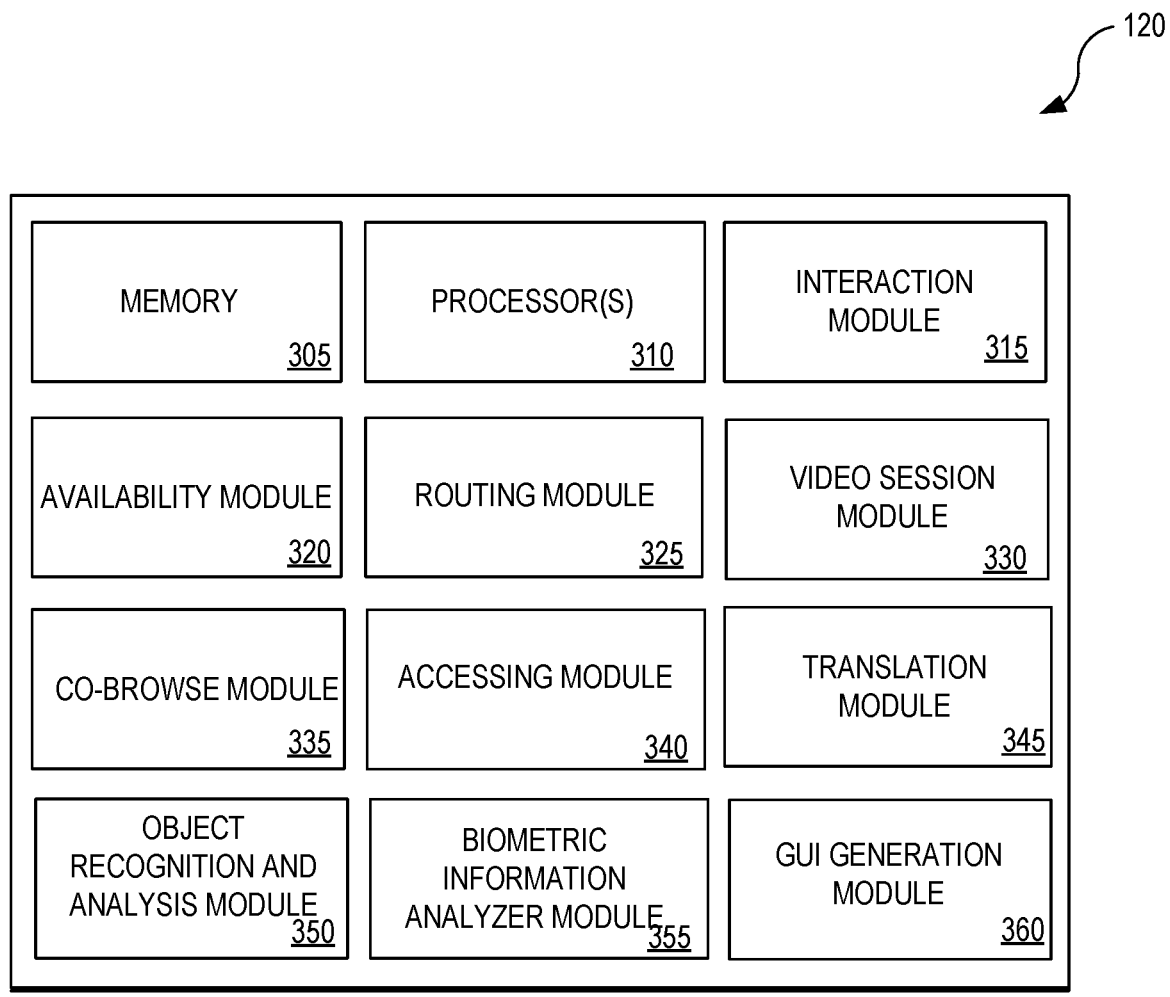
FIG. 3 illustrates various components of a video session platform that may be used in accordance with various embodiments of the present disclosure.

FIG. 3 illustrates a set of components within video session platform 120 according to one or more embodiments of the present disclosure. According to the embodiments shown in FIG. 3, video session platform 120 can include memory 305, one or more processors 310, interaction module 315, availability module 320, routing module 325, video session module 330, co-browse module 335, accessing module 340, translation module 345, object recognition and analysis module 350, biometric information analyzer module 355, and GUI generation module 360. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of interaction module 315, availability module 320, routing module 325, video session module 330, co-browse module 335, accessing module 340, translation module 345, object recognition and analysis module 350, biometric information analyzer module 355, and GUI generation module 360.

Interaction module 315 can determine the current activities of the user to determine the representative or type of representative who should receive a call from the user. For example, the user may be accessing a particular website or a particular tab on a mobile application (e.g., user looking at investments may have a question for a representative specializing in investments). In another example, interaction module 315 can identify a particular device and retrieve from a database any associated activities particularly performed on that particular device (e.g., banking transactions are always done on a laptop on a home network). Location detection techniques (e.g., a Wi-Fi signal, a RFID signal, an NFC signal, a satellite signal, a cellular signal, and a Bluetooth signal) may be used to determine a current location of the user (e.g., at a car dealership, attorney's office, bank, hospital) to better understand a current activity of the user. In some embodiments, the user's activity on a social platform, such as Facebook, can be detected and used to indicate activity for the purpose of smartly routing or initiating a video session.

In some embodiments, interaction module 315 can provide a solution that allows for the user to connect straight to a call center without downloading an application (i.e., a plug-in-less solution). For example, certain browsers can be used to initiate calls without requiring additional software to be downloaded.

In some embodiments, interaction module 315 allows users to connect directly to the call center and engage in a video chat without going through a web conference. To do so, the system will provide a direct address to the representative, allowing the user to connect immediately.

In some embodiments, instead of a user going to a certain page on a website or clicking on a certain page of a mobile application, the user can be sent a link to a wearable (e.g., glasses, watch). The link can route the user directly to a representative for a video conference. Connecting via to wearables can allow the system to engage in active monitoring for user activities and build business rules to determine a potential need of the user to engage with a representative via video call. Push notification and short message service technology can be used to send the user a link to route the user directly to the call center.

In some embodiments, virtual reality technology can allow users to engage in face-to-face interaction with the representative.

Interaction module 315 can further determine whether the user is eligible for a video session. Eligibility requirements may include, for example, that the time is within the hours of operation that video sessions are offered, that the device is capable of receiving video, that the device has appropriate software downloaded, that the device has a connection to the internet, and/or that the user has logged into the application or the website. When a user is eligible for a video session, an interaction module may display an option for video chat on the user's device via a mobile application, text message or other notification.

In some embodiments, depending on detected activities, a user must use a virtual assistant and/or live chat before initiating a video session. Then depending on the type of questions being asked and/or a wait time for a video session as determined by availability module 320, the user may be transitioned into a video session, assuming all other eligibility requirements are met. Thus, in some embodiments, the user is transitioned to a video session gradually.

Availability module 320 estimates wait times for a video session with a representative and/or a specialized representative. The wait time may be estimated based on a number of users in line in front of the user and on the expected nature of their video sessions. In some embodiments, the number of users in line ahead of the user is displayed on a real-time or near real-time basis. The wait times may be displayed prior to the user initiating a video session and/or while the user is waiting for a representative.

Routing module 325 can route the video session to a representative based on the interaction (e.g., current tab, page or search of the user's device; search history of one or more of the user's devices; products recently bought; recent life events, such as getting married) and location of the device. Thus, routing module 325 intelligently targets representatives ("video with a purpose"). In an example, the system may determine that the user is at a car dealership and recent application activity or web history on the user's device shows that the user was looking at used cars. When the user selects video session, the call may be routed to a representative who can answer questions regarding prices, availability of cars in the area or other options for purchasing a car. In some embodiments, the user may be directed to a consumer lending representative if the user is located at the car lot and was looking specifically at interest rates during their interactions on the mobile application or on one or more websites.

Video session module 330 can stream a live video feed from the representative to the user and vice versa. The live video capability can provide the representative with additional information about the user. For example, biometrics can be analyzed by biometric information analyzer module 355 to determine a state of the user (e.g., upset, frustrated, happy, anxious). Such information may guide the representative in responding to the user.

The video capability may increase the efficiency of the interaction in several aspects. For example, the user can send a video of a document needed for a loan to the representative. The video capability can provide the video to object recognition and analysis module 350 to analyze (e.g., take a picture, scan the contents, OCR the document) and to present the document to the representative to review, to send to a different representative or business unit, and/or to store in a database. In another example, the user can send a real-time view of a car accident, a damaged home, a home that needs to be appraised, and other real-time views. In some embodiments, the representative can access the user's device to obtain information (e.g., turn on a device flashlight, zoom in on a particular object).

In some embodiments, multiple parties can be added to the video session. For example, an interpreter, attorney, spouse, or other party may be needed during the video session, creating a multi-party video session. Each party to the multi-party video session can be receiving and sending, and/or receiving video. In some embodiments, two users can participate in a video session via an application or website. Based on the user's conversation, interactions with the mobile application, and/or facial expressions, a representative (or virtual assistant) can offer up guidance and/or documents to assist the users reach their end goals (e.g., set up a mutual fund).

In some embodiments, the user is already authenticated to the video session because the user has already provided authentication information. For example, when the user makes a call from an application on the user's device, the user is authenticated to the video session because the user provided authentication credentials to log in to the mobile application and the user has the mobile device (i.e., the system can identify the mobile device as being registered to the user). The representative can verify the user's identity by receiving an analysis of the user's biometric information (e.g., analysis on the user's face), particularly when the call is a two-way exchange of video.

In some embodiments, instead of the video session being live or in real-time, video session module 330 can prepare and send a pre-recorded video session for the user. For example, if the user receives an appointment with a representative to discuss a property claim, the representative may not be present, but the user can open a pre-recorded video of the representative asking the user questions about the property claim. The user can answer each of the questions in real-time while the video is recording the user's answers. The user's video is then sent to the representative. If a further discussion is needed, the representative can send a follow-up video conference call request. Based on emotional responses detected from watching the video (e.g., facial expressions, voice changes, skin tone change), if a follow-up is needed, the representative can soften, or otherwise change, the follow-up questions, the representative's tone and/or facial expressions. Thus, the pre-recorded video, like the live video, can be used to intelligently understand and modify questions based on user's responses and the manner in which he or she responded.

Co-browse module 335 can allow the representative to co-browse the user's application, website, or other channel with the user during the video session. This way, when the user switches to a different tab or place in the mobile application, the representative can see what the user is doing and provide input and guidance.

Accessing module 340 can allow the representative to access the application, website or device of the user. This can allow the representative to annotate a user's screen (e.g., highlight, circle, or type information) and to access certain documents, such as photos. In some embodiments, the representative can access information from various applications on the user's device. In some embodiments, control of a drone can be shared through the video session. The drone can be assisting with an inspection and provide data to the user and the representative (e.g., a status of the roof).

Translation module 345 can provide automatic translation for the user or the representative. For example, if the video session is between a Spanish-speaking user and an English-speaking representative, translation module 345 can automatically translate the user's words into English and the representative's words into Spanish and speak or type them to the user or representative so that there is no or a very slight delay in communications. In another example, if a mute person communicates using sign language on the video session, translation module 345 can translate the sign language to words. In this example, the user must be sharing video or the translation must occur on the user's device.

Object recognition and analysis module 350 can receive images or videos of objects, analyze the object and provide information to the user and/or the representative during the video session. For example, if a user's house has burned down, leaving only charred remains of various items, such as furniture, object recognition and analysis module 350 can analyze the damage done to the objects, estimate a total damage, review the user's insurance coverage, and determine an estimated amount due to the user. In some embodiments, a claim may be started for the user with information collected from the video session.

In some embodiments, object recognition and analysis module 350 can analyze the video in real-time or at a later time to determine an insurance policy, to inspect a property, and/or to appraise a property. For example, object recognition and analysis module 350 can record and measure volume of space in a home (e.g. square footage of home), determine a type and condition of a roof or floor, or estimate the cost to insure a new shed or garage. In some embodiments, object recognition and analysis module 350 can receive a video of each page of a document on the video session, use optical character recognition or other process to determine the text, and instantly transfer the document to the representative. In some embodiments, this feature can be performed by device 110. In some embodiments, object recognition and analysis module 350 can use a reverse camera.

Biometric information analyzer module 355 can receive and analyze biometric information (e.g., face and other body parts, voice, eye movement) captured via the video received from the caller and use it to provide additional information to the representative. For example, biometric information analyzer module 355 can retrieve previously collected biometric samples (e.g., eye movement, voice, heart rate, facial expressions, tone of skin) of the user in certain states with a corresponding record of the state of the user (e.g., happy, sad, angry, frustrated) from the database and compare it to the biometric samples being retrieved on the video session to determine a current state of the user. In some embodiments, biometric information analyzer module 355 does not use previously collected information but simply examines the video for biometric cues (e.g., skin tone change, facial expressions) to determine whether the user is becoming upset. In some embodiments, sensors coupled with the user or the user's device may provide additional information, such as pulse, oxygen level, calorie intake, and sleep information.

The state of the user can be provided to the representative. In some embodiments, this information is updated in real-time and guidance or guidelines can be given to the representative to ensure proper handling of the video session. In some embodiments, device 110 can analyze, in whole or in part, the biometric samples and/or compare the biometric samples. Biometric samples received via the video feed during the video session can also be used to authenticate a document, identify and/or verify the caller, or for other purposes.

GUI generation module 360 is capable of generating one or more GUI screens that allow interaction with a user. In at least one embodiment, GUI generation module 360 generates a graphical user interface receiving information from and/or conveying information to the user, including a video feed. For example, GUI generation module 360 may display the user's identity and preferences, the website or tab of a mobile application of the user's device, and the state of the user via a biometric analysis.

Figure 4:
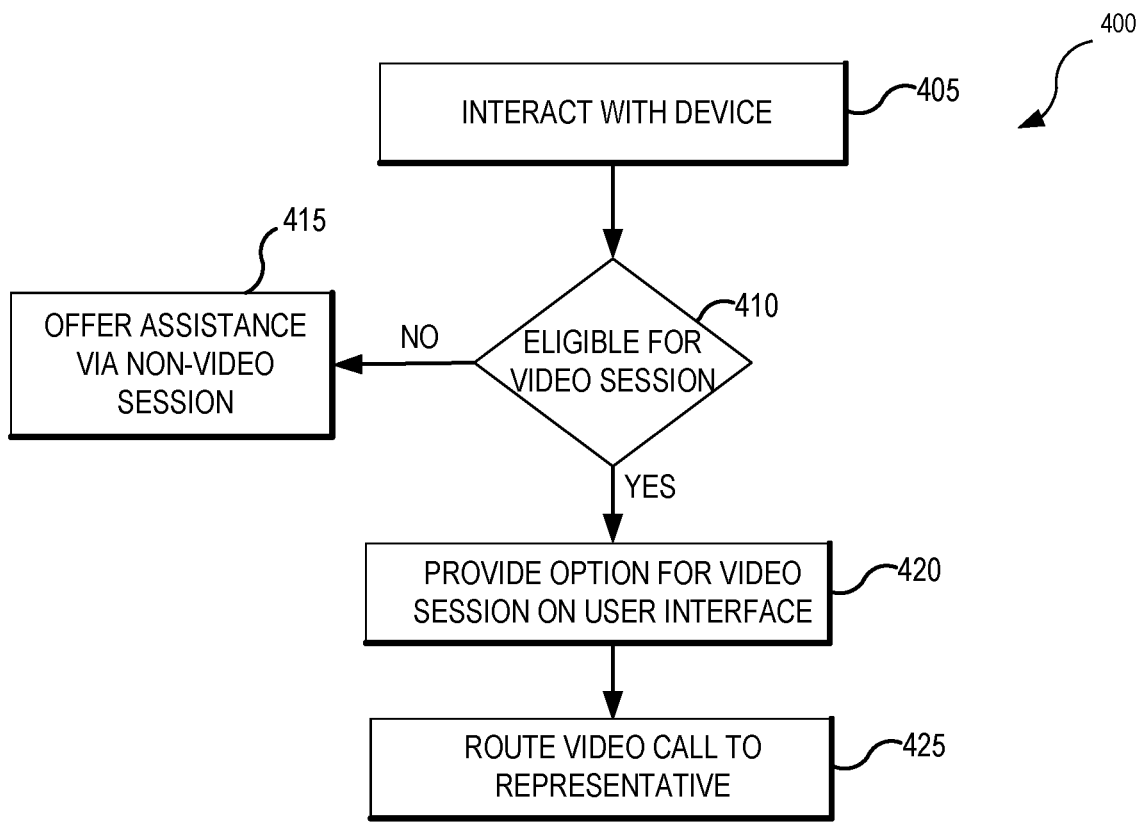
FIG. 4 is a flowchart illustrating a set of operations for conducting a video session in accordance with various embodiments of the present disclosure.
Figure 5:
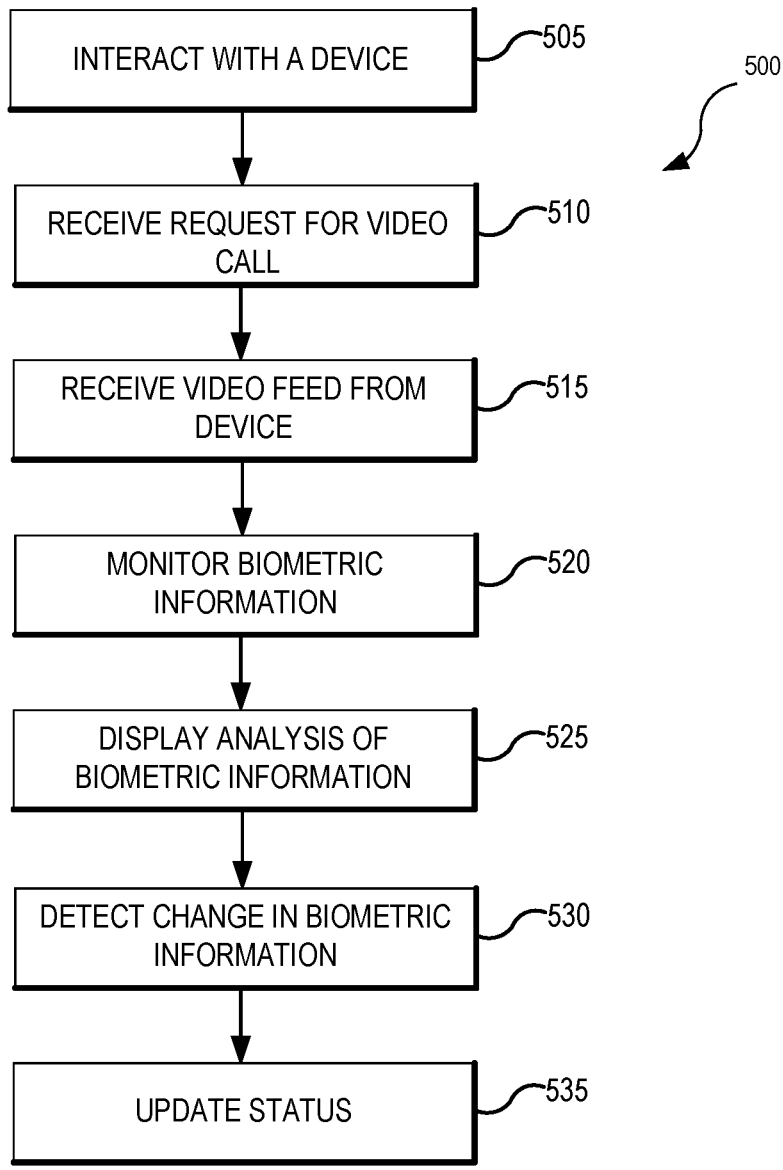
FIG. 5 is a flowchart illustrating a set of operations for conducting a video session in accordance with various embodiments of the present disclosure.

FIGS. 4-5 are flowcharts illustrating sets of operations for conducting a video session. In some embodiments, fewer than all of the operations in each set of operations are performed, whereas in other embodiments additional operations are performed. Moreover, in some embodiments, the operations may be performed in different orders or in parallel. The operations can be performed by the components of device 110 illustrated in FIG. 2, third party 135, and/or various components of video session platform 120 illustrated in FIG. 3.

Referring to the flowchart 400 of FIG. 4, interacting operation 405 interacts with a device via a channel. The channel may be a mobile application or a website. For example, the user may be looking at the user's investments. Decision operation 410 determines whether the interaction is eligible for a video session. Eligibility may depend on whether the device has an internet connection, whether the time is within the hours of operation of video sessions, and/or whether the user has exhausted other options (e.g., user has accessed/used a virtual assistant, chat, voice-only phone call).

When the user is ineligible for a video session, decision operation branches to operation 415 in which the user is offered assistance using non-video session methods, such as an interactive voice response system, voice only call, help menu in the mobile application or website, or a pre-recorded video. When decision operation 410 determines that interaction is eligible for a video session, then decision operation 410 branches to providing operation 420. Providing operation 420 provides an option for a video session on a user interface of the device. The option can be provided through the mobile application (e.g., a push notification, included on a tab of the mobile application). Routing operation 425 routes the video session to a representative. In some embodiments, the video session is routed to a uniquely skilled representative. The unique skills needed to answer the video session may be determined by the interactions (e.g., what was/has the user been querying). In some embodiments, the unique skills may be further determined by a location of the user (e.g., at a bank, car dealership, attorney's office).

Referring to the flowchart 500 of FIG. 5, interacting operation 505 interacts with a user through the user's device. The interaction may include an interaction on a mobile application downloaded on a mobile device. Receiving operation 510 receives a request for a video session. Receiving operation 515 receives video feed from the device indicating a two-way sharing of video. Monitoring operation 520 monitors biometric information collected from the sharing of the video. For example, the user's skin tone, facial expressions, and eye movements may be monitored. The biometric information may be analyzed and such analysis (e.g., "user appears stressed out," "user appears angry") may be displayed on a user interface of the user in displaying operation 525. To analyze the information, the user's biometric information may be compared to previously collected biometric information.

Detecting operation 530 monitors the user's biometric information and detects changes in the user's biometric information. The user's status may be updated as the information changes (e.g., "user appears to be less stressed out," "user appears to be getting angrier") in updating operation 535. This information may be useful in guiding the representative. For example, a certain protocol may be used for caller's who are very agitated, or additional products may be offered to users who appear happy.

Figure 6:
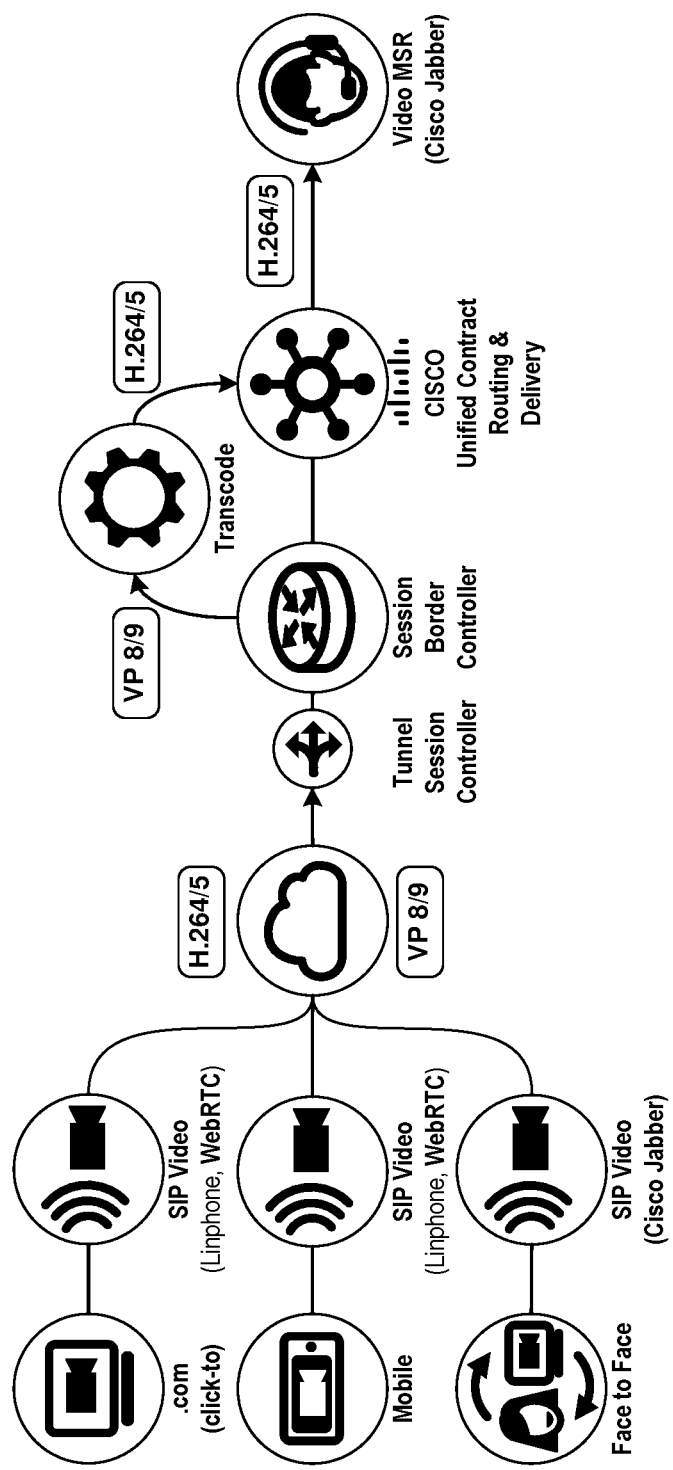
FIG. 6 is a diagram illustrating how a video solution may be integrated for a single user in accordance with various embodiments of the present disclosure.
Figure 7:
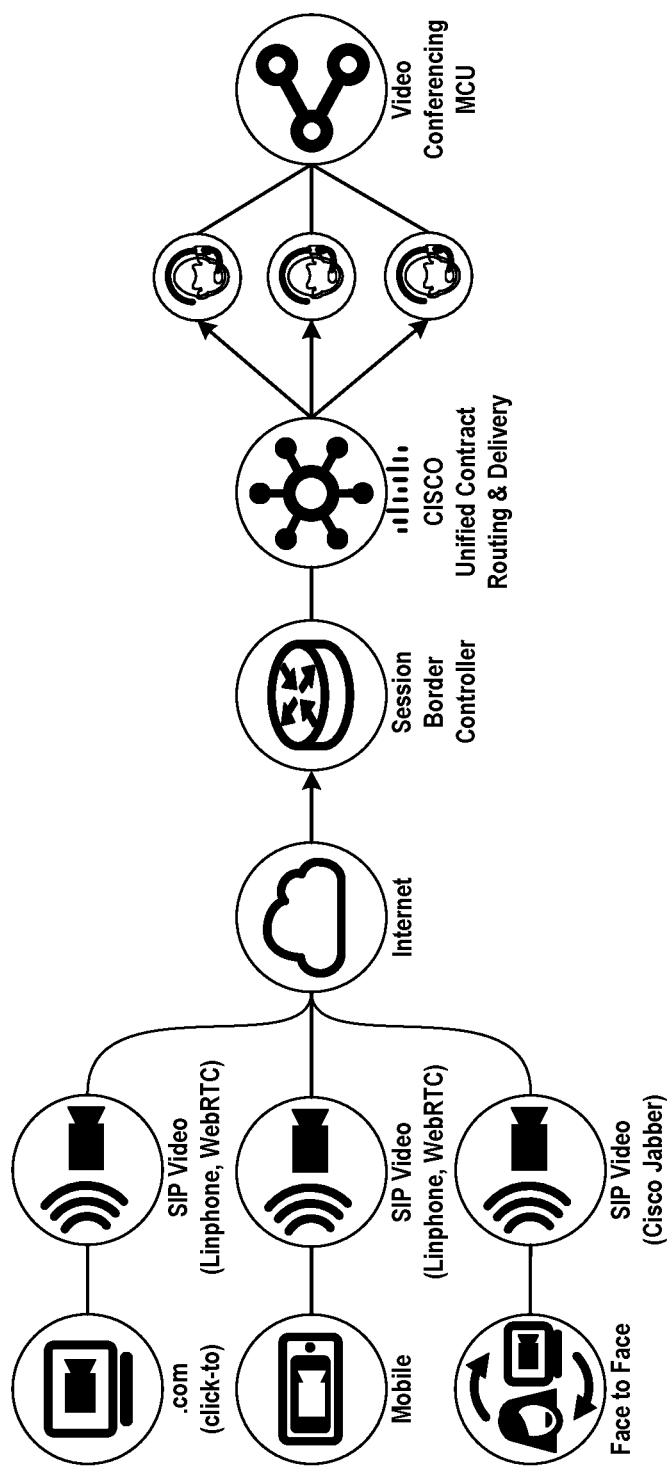
FIG. 7 is a diagram illustrating how a video solution may be integrated for multiple users in accordance with various embodiments of the present disclosure.

FIGS. 6 and 7 are diagrams illustrating how a video solution may be integrated. As shown in FIGS. 6 and 7, regardless of the channel (e.g., website, mobile application, face-to-face at an organization), the user will have a similar experience when initiating a video session with the organization. This is accomplished by a unification of architecture, such that a singular platform manages access to the organization without regard to the device or application being used (i.e., the same queuing and routing delivery/endpoint strategy can be used for all parts of the organization). As shown, different access points use a centralized codec and a centralized delivery architecture.

Computer System Overview

Figure 8:
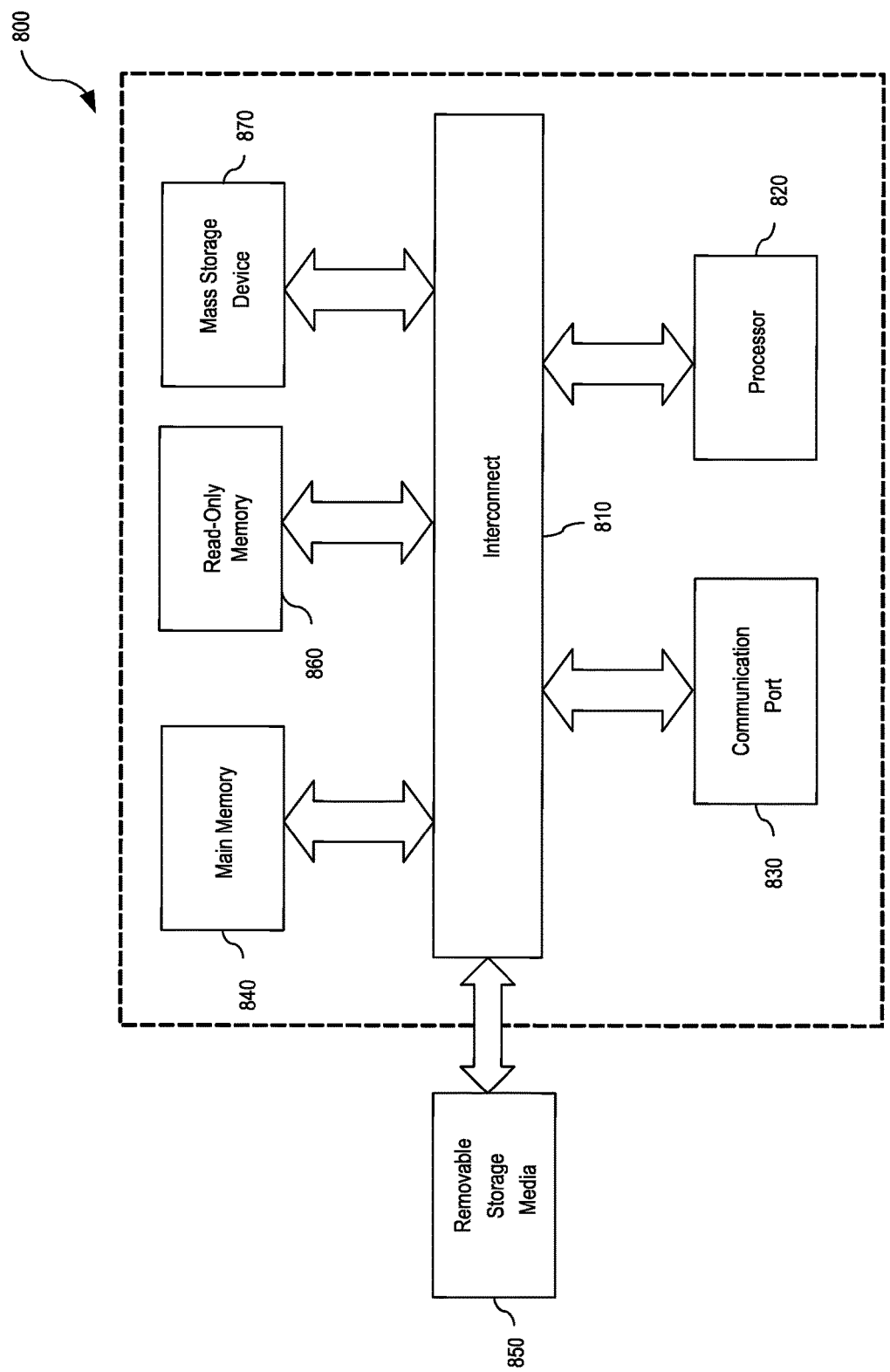
FIG. 8 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system 800 includes an interconnect 810, at least one processor 820, at least one communication port 830, a main memory 840, a removable storage media 850, a read only memory 860, and a mass storage 870.

Processor(s) 820 can be any known processor, such as, but not limited to, an Intel® Itanium® or Itanium 2® processor(s), or AMD® Opteron® or Athlon MP® processor(s), or Motorola® lines of processors. Communication port(s) 830 can be an RS-232 port for use with a modem-based dialup connection, a 10/100 Ethernet port, or a Gigabit port using copper or fiber. Communication port(s) 830 may be chosen depending on a network, such as a Local Area Network (LAN), a Wide Area Network (WAN), or any network to which the computer system 800 connects.

Main memory 840 can be random access memory (RAM) or any other dynamic storage device(s) commonly known in the art. Read-only memory 860 can be any static storage device(s) such as Programmable read-only memory (PROM) chips for storing static information, such as instructions for processor 820.

Mass storage 870 can be used to store information and instructions. For example, hard discs such as the Adaptec® family of SCSI drives, an optical disc, an array of discs such as RAID, the Adaptec family of RAID drives, or any other mass storage devices may be used.

Interconnect 810 communicatively couples processor(s) 820 with the other memory, storage, and communication blocks. Interconnect 810 can be a PCI/PCI-X- or SCSI-based system bus, depending on the storage devices used.

Removable storage media 850 can be any kind of external hard-drives, floppy drives, IOMEGA® Zip Drives, Compact Disc-Read-Only Memory (CD-ROM), Compact Disc-Re-Writable (CD-RW), Digital Video Disc-Read-Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices, such as cell phone networks and compatible devices. In addition, embodiments are applicable to all levels of computing, from the personal computer to large network mainframes and servers.

In conclusion, the present disclosure discloses novel systems, methods, and arrangements for integrating a strategic video solution. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations that fall within the scope of the claims, together with all equivalents thereof. Therefore, the above description should not be taken as limiting.

What is claimed is:

1. A method comprising:
engaging, via a communications network, in an interaction with a user via a channel on a device associated with the user;
actively monitoring activities of the user to determine a potential need for the user to engage with a representative via a video session;
in response to the activities indicating the potential need to engage in the video session with the representative, sending, to the device, a link that routes the user directly to a uniquely skilled representative;
in response to the user selecting the link requesting the video session, routing the video session to the uniquely skilled representative; and
transferring the video session from the device associated with the user to a second device associated with the user in response to the user touching the device with the second device.

2. The method of claim 1, the method further comprising determining whether the interaction is eligible for the video session by:
determining whether the interaction is occurring outside of video session operation hours; and
determining whether the device is connected to the Internet.

3. The method of claim 1, wherein the channel is a website portal.

4. The method of claim 1, wherein the channel is a mobile application.

5. The method of claim 1, the method further comprising:
in response to receiving a selection of the link, receiving a video feed from the device.

6. The method of claim 5, the method further comprising:
analyzing one or more objects received in the video feed;
estimating a cost of damage to the one or more objects; and
determining insurance coverage of the one or more objects.

7. The method of claim 5, the method further comprising:
analyzing biometric information of the user received in the video feed to determine biometric characteristics;
retrieving, from a database, previously recorded biometric characteristics of the user and an associated state of the user;
comparing the biometric characteristics with the previously recorded biometric characteristics of the user to determine a current state of the user; and
notifying the uniquely skilled representative of the current state of the user.

8. The method of claim 7, wherein the biometric information includes skin tone and facial expressions.

9. The method of claim 5, the method further comprising:
analyzing biometric information of the user received in the video feed;
detecting a change in the biometric information during the video session;
determining a state of the user based on the change in the biometric information; and
updating, in real-time, the state of the user on a user interface of the uniquely skilled representative.

10. The method of claim 1, the method further comprising collecting data from one or more sensors coupled to the user, wherein the one or more sensors include one or more of a heart rate monitor, a blood pressure monitor, a sleep tracking monitor, and a calorie intake monitor, wherein the device is wearable, and wherein the one or more sensors are coupled to the wearable.

11. The method of claim 1, wherein the channel is a mobile application, wherein a video of the uniquely skilled representative is overlaid on a tab of the mobile application, wherein a size of the video received by the device can be changed using pinch and zoom features.

12. The method of claim 1, the method further comprising allowing the uniquely skilled representative to co-browse on the device during the video session.

13. The method of claim 1, wherein the channel is a mobile application, wherein the method further comprises accessing, by the uniquely skilled representative, the mobile application.

14. The method of claim 13, wherein accessing, by the uniquely skilled representative, the mobile application includes allowing the uniquely skilled representative to annotate information within the mobile application.

15. The method of claim 1, the method further comprising:
offering assistance from a virtual assistant before providing an option for the video session or during a wait time after the video session has been initiated.

16. The method of claim 1, the method further comprising:
receiving a video of a document via the video session;
generating the document based on the video; and
displaying the generated document on a screen of the uniquely skilled representative.

17. The method of claim 1, the method further comprising estimating a wait time until the video session will be answered by the uniquely skilled representative, the wait time based on a number of other users in a queue ahead of the user; and
displaying, via the channel, the wait time on the device, wherein the wait time is displayed on a user interface in response to an option for the video session being displayed on the user interface and the user being eligible for the video session.

18. A video session platform, comprising:
one or more processors; and
a computer readable storage medium having instructions stored thereon, which when executed by the one or more processors cause the video session platform to:
engage, via a communications network, in an interaction with a user via a channel on a device associated with the user;
actively monitor activities of the user to determine a potential need for the user to engage with a representative via a video session;

in response to the activities indicating the potential need to engage in the video session with the representative, send, to the device, a link that routes the user directly to a uniquely skilled representative;

in response to the user selecting the link requesting the video session, route the video session to the uniquely skilled representative; and transfer the video session from the device associated with the user to a second device associated with the user in response to the user touching the device with the second device.

19. At least one non-transitory computer-readable medium comprising a set of instructions that, when executed by one or more processors, cause a machine to perform operations comprising:

engaging, via a communications network, in an interaction with a user via a channel on a device associated with the user;

actively monitoring activities of the user to determine a potential need for the user to engage with a representative via a video session;

in response to the activities indicating the potential need to engage in the video session with the representative, sending, to the device, a link that routes the user directly to a uniquely skilled representative;

in response to the user selecting the link requesting the video session, routing the video session to the uniquely skilled representative; and transferring the video session from the device associated with the user to a second device associated with the user in response to the user touching the device with the second device.

20. The at least one non-transitory computer-readable medium of claim 19, where the operations further comprise: collecting data from one or more sensors coupled to the user, wherein the one or more sensors include one or more of a heart rate monitor, a blood pressure monitor, a sleep tracking monitor, and a calorie intake monitor, wherein the device is wearable, and wherein the one or more sensors are coupled to the wearable.

\* \* \* \* \*